(12) United States Patent
Seol et al.

(10) Patent No.: US 11,201,716 B2
(45) Date of Patent: Dec. 14, 2021

(54) APPARATUS AND METHOD FOR CONTROLLING INTER-CELL INTERFERENCE IN TIME DIVISION DUPLEX BASED WIRELESS COMMUNICATION SYSTEM

(71) Applicant: Samsung Electronics Co., Ltd., Suwon-si (KR)

(72) Inventors: Daeyoung Seol, Suwon-si (KR); Yo Han Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 16/485,633

(22) PCT Filed: Mar. 13, 2017

(86) PCT No.: PCT/KR2017/002682
§ 371 (c)(1),
(2) Date: Aug. 13, 2019

(87) PCT Pub. No.: WO2018/147503
PCT Pub. Date: Aug. 16, 2018

(65) Prior Publication Data
US 2019/0372740 A1 Dec. 5, 2019

(30) Foreign Application Priority Data
Feb. 13, 2017 (KR) ........................ 10-2017-0019672

(51) Int. Cl.
*H04L 5/14* (2006.01)
*H04L 5/00* (2006.01)
(Continued)

(52) U.S. Cl.
CPC .............. *H04L 5/0073* (2013.01); *H04L 5/14* (2013.01); *H04W 72/048* (2013.01); *H04W 88/08* (2013.01)

(58) Field of Classification Search
CPC ... H04W 28/04; H04W 72/048; H04W 88/08; H04L 5/0073; H04L 5/14
(Continued)

(56) References Cited

U.S. PATENT DOCUMENTS

2011/0117953 A1 5/2011 Kim et al.
2014/0307591 A1 10/2014 Wang et al.
(Continued)

OTHER PUBLICATIONS

LG Electronics; Discussion on dynamic and semi-static DL/UL configuration for inter-cell interference coordination/handling; 3GPP TSG RAN WG1 Meeting #87; R1-1611859; Nov. 14-18, 2016; Reno, NV.
(Continued)

*Primary Examiner* — Angel T Brockman
(74) *Attorney, Agent, or Firm* — Jefferson IP Law, LLP

(57) ABSTRACT

The disclosure relates to a pre-5th-generation (5G) or 5G communication system to be provided for supporting higher data rates beyond 4th-generation (4G) communication system such as long term evolution (LTE). According to the disclosure, a method for operating a base station in a wireless communication system includes allocating a resource within a subframe, which is not consistent with a pre-determined time division duplex (TDD) configuration in the TDD configuration being used, based on an inter-cell interference, and performing communication with at least one terminal in the subframe. This study was carried out with the support of "Cross-Ministry Giga KOREA Project" of the Ministry of Science, ICT, and Future Planning.

18 Claims, 11 Drawing Sheets

(51) Int. Cl.
*H04W 72/04* (2009.01)
*H04W 88/08* (2009.01)

(58) Field of Classification Search
USPC .......................................... 370/280
See application file for complete search history.

(56) References Cited

U.S. PATENT DOCUMENTS

2014/0369281 A1    12/2014  Zhu et al.
2015/0078220 A1     3/2015  Hu et al.
2016/0164656 A1     6/2016  Khoryaev et al.

OTHER PUBLICATIONS

3GPP; 3rd Generation Partnership Project; Technical Specification Group Radio Access Network; Evolved Universal Terrestrial Radio Access (E-UTRA); Physical channels and modulation (Release 15); 3GPP TS 36.211; V15.6.0; Jun. 2019; Valbonne, FR.
Korean Office Action dated May 25, 2021, issued in Korean Office Application No. 10-2017-0019672.

| TDD_CONFIG_1 | U | D | D | D | D | D | D | D | ~401 |
| TDD_CONFIG_2 | U | D | D | D | U | D | D | D | ~403 |
| TDD_CONFIG_3 | U | D | D | D | U | D | D | D | ~405 |
| TDD_CONFIG_4 | U | D | D | D | U | D | U | D | ~407 |
| TDD_CONFIG_5 | U | D | U | U | U | D | U | D | ~409 |

D : Downlink, U : Uplink

FIG.4

APPARATUS AND METHOD FOR CONTROLLING INTER-CELL INTERFERENCE IN TIME DIVISION DUPLEX BASED WIRELESS COMMUNICATION SYSTEM

TECHNICAL FIELD

The disclosure generally relates to a wireless communication system and, more particularly, to an apparatus and a method for controlling inter-cell interference in a wireless communication system.

This study was carried out with the support of "Cross-Ministry Giga KOREA Project" of the Ministry of Science, ICT, and Future Planning.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A time division duplex (TDD) system can perform data transmission and reception through a downlink (DL) or an uplink (UP) using the same frequency resource at different times. When the ratio of time resources used for DL transmission and those for UL transmission is dynamically adjusted according to the characteristics of data, it is possible to efficiently use time resources. However, when adjacent cells perform data transmission in different directions at the same time, inter-cell interference may occur.

DISCLOSURE OF INVENTION

Technical Problem

Therefore, the disclosure has been made in view of the above-mentioned problems, and the disclosure provides an apparatus and a method for controlling inter-cell interference in a wireless communication system.

Further, the disclosure provides an apparatus and a method for controlling interference between downlink (DL) transmission and uplink (UL) transmission when adjacent cells apply different time division duplex (TDD) configurations in a wireless communication system.

The disclosure also provides an apparatus and a method for determining a subframe which is not consistent with a predetermined TDD configuration in the TDD configuration in a wireless communication system.

In addition, the disclosure provides an apparatus and a method for allocating a resource for a subframe which has possible inter-cell interference in a wireless communication system.

Furthermore, the disclosure provides an apparatus and a method for managing a dynamic TDD configuration in consideration of the characteristics of traffic in a wireless communication system.

Solution to Problem

According to various embodiments of the disclosure, a method for operating a base station in a wireless communication system includes allocating a resource within a subframe, which is not consistent with a predetermined time division duplex (TDD) configuration, in a TDD configuration being used based on inter-cell interference, and performing communication with at least one terminal in the subframe.

According to various embodiments of the disclosure, an apparatus for a base station in a wireless communication system includes a controller configured to allocate a resource within a subframe, which is not consistent with a predetermined time division duplex (TDD) configuration, in a TDD configuration being used based on inter-cell interference, and a transceiver configured to perform communication with at least one terminal in the subframe.

Advantageous Effects of Invention

According to an apparatus and a method in accordance with various embodiments of the disclosure, it is possible to efficiently use time resources and to control inter-cell interference.

Effects which can be acquired by the disclosure are not limited to the above described effects, and other effects that have not been mentioned may be clearly understood by those skilled in the art from the following description.

BRIEF DESCRIPTION OF DRAWINGS

FIG. 4 illustrates a time division duplex (TDD) configuration according to various embodiments of the disclosure;

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to an apparatus and a method for controlling inter-cell interference in a wireless communication system. Specifically, the disclosure describes a technique for controlling inter-cell interference based on a time division duplex (TDD) configuration in a wireless communication system.

As used herein, a term referring to a signal, a term referring to a signal structure, a term referring to a channel, a term referring to control information, terms referring to network entities, a term referring to a component of an apparatus, and the like are used for convenience of explanation. Therefore, the disclosure is not limited by the following terms, and other terms having equivalent technical meanings may be used.

Further, although the disclosure illustrates various embodiments using terms used in some communication standards (e.g., long-term evolution (LTE) or LTE-advanced (LTE-A)), these standards are provided merely for convenience of description. Various embodiments of the disclosure may be easily modified and applied to other communication systems.

Figure 1:
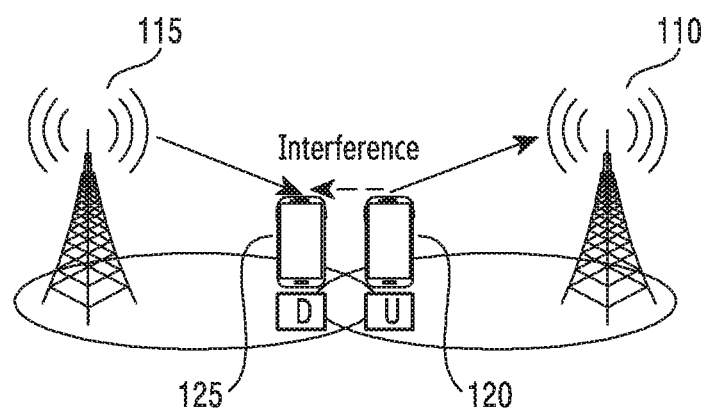
FIG. 1 illustrates a wireless communication system according to various embodiments of the disclosure.

FIG. 1 illustrates a wireless communication system according to various embodiments of the disclosure. FIG. 1 illustrates a base station 110, a base station 115, a terminal 120, and a terminal 125 as some nodes using a wireless channel in the wireless communication. Although FIG. 1 shows only two base stations, another base station equivalent or similar to the base station 110 and the base station 115 may be further included.

The base station 110 is a piece of network infrastructure that provides wireless access for the terminal 120. The base station 115 is a piece of network infrastructure that provides wireless access for the terminal 125. Each of the base station 110 and the base station 115 has coverage defined as a certain geographic area based on the distance over which the base station 110 can transmit a signal. Each of the base station 110 and the base station 115 may be referred to as an access point (AP), an eNodeB (eNB), a 5th-generation (5G) node, a wireless point, a transmission/reception point (TRP), or other terms with equivalent technical meanings, in addition to a base station.

Each of the terminal 120 and the terminal 125 is a device used by a user. The terminal 120 may communicate with the base station 110 through a wireless channel, and the terminal 125 may communicate with the base station 115 through a wireless channel. In some cases, at least one of the terminal 120 and the terminal 125 may be operated without a user's involvement. That is, at least one of the terminal 120 and the terminal 125 may be a device performing machine-type communication (MTC), and may not be carried by a user. Each of the terminal 120 and the terminal 125 may be referred to as user equipment (UE), a mobile station, a subscriber station, a remote terminal, a wireless terminal, a user device, or other terms with equivalent technical meanings, in addition to a terminal.

During the same time period, the terminal 120 may transmit data to the base station 110 through an uplink (UL) channel, and the base station 115 may transmit data to the terminal 126 through a downlink (DL) channel. Here, interference may occur between communication between the terminal 120 and the base station 110 and communication between the terminal 125 and the base station 115. Therefore, a technique for controlling interference that occurs when adjacent base stations perform communication in different directions is required.

In various embodiments of the disclosure, it is assumed that the base station 110 does not broadcast a TDD configuration as system information and can report whether each subframe is for UL transmission or for DL transmission to the terminal 120 through a DL control channel. However, even when a TDD configuration is broadcast as system information, various embodiments to be described below may be applied.

Figure 2:
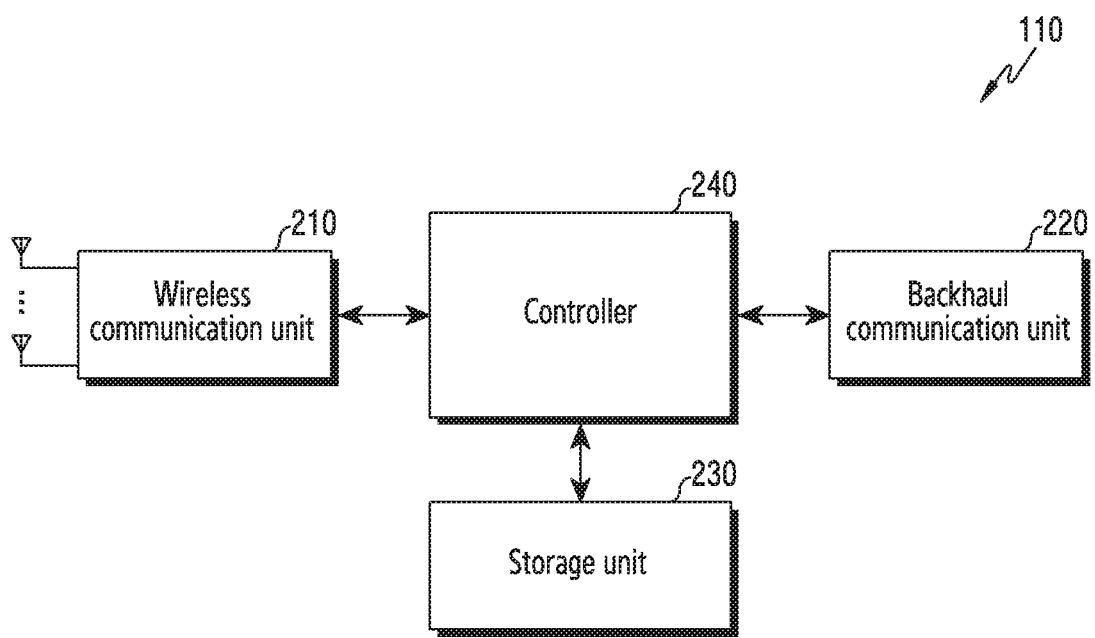
FIG. 2 illustrates the configuration of a base station in a wireless communication system according to various embodiments of the disclosure.

FIG. 2 illustrates the configuration of a base station in a wireless communication system according to various embodiments of the disclosure. The configuration illustrated in FIG. 2 may be construed as the configuration of the base station 110. The terms 'unit,' '-or/er,' and the like used herein indicate a unit for processing at least one function or operation, which may be implemented by hardware, software, or a combination thereof.

Referring to FIG. 2, the base station 110 includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bit stream according to the physical layer specification of a system. For example, in data transmission, the wireless communication unit 210 encodes and modulates a transmitted bit stream to generate complex symbols. Further, in data reception, the wireless communication unit 210 demodulates and decodes a baseband signal to reconstruct a received bit stream. The wireless communication unit 210 upconverts a baseband signal into a radio-frequency (RF) band signal, and may transmit the RF band signal through an antenna. The wireless communication unit 210 down-converts an RF band signal, received through the antenna, into a baseband signal.

To this end, the wireless communication unit 210 may include a transmission filter, a reception filter, an amplifier, a mixer, an oscillator, a digital-to-analog converter (DAC), an analog-to-digital converter (ADC), or the like. Further, the wireless communication unit 210 may include a plurality of transmission/reception paths. In addition, the wireless communication unit 210 may include at least one antenna array including a plurality of antenna elements. From the aspect of hardware, the wireless communication unit 210 may include a digital unit and an analog unit, and the analog unit may include a plurality of sub-units according to operating power, operating frequency, or the like.

As described above, the wireless communication unit 210 transmits and receives a signal. Accordingly, the wireless communication unit 210 may be referred to as a transmitter, a receiver, or a transceiver. In the following description, transmission and reception performed through a wireless channel are construed as including processing performed as above by the wireless communication unit 210.

The backhaul communication unit 220 provides an interface for performing communication with other nodes in a network. That is, the backhaul communication unit 220 converts a bit stream, which is transmitted from the base station 110 to another node, for example, another access node, another base station, a higher node, a core network, or the like, into a physical signal, and converts a physical signal, which is received from another node, into a bit stream.

The storage unit 230 stores data, such as a default program, an application, and setting information, for the operation of the base station 110. The storage unit 230 may be configured as volatile memory, nonvolatile memory, or a combination of volatile memory and nonvolatile memory. The storage unit 230 provides the stored data in response to a request from the controller 240.

The controller 240 controls the overall operation of the base station 110. For example, the controller 240 transmits and receives a signal through the wireless communication unit 210 or the backhaul communication unit 220. Further, the controller 240 records and reads data in the storage unit 230. To this end, the controller 240 may include at least one processor. For example, the controller 240 may control the base station 110 to perform operations according to various embodiments to be described below.

Figure 3:
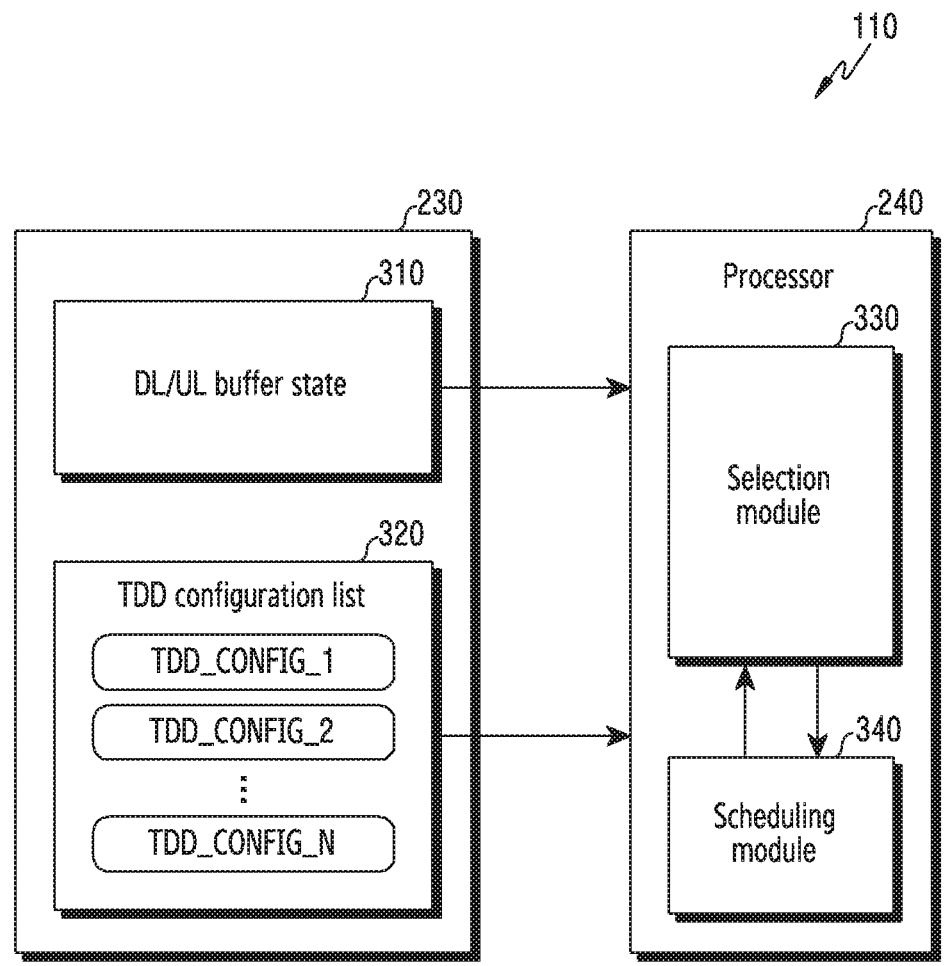
FIG. 3 illustrates a link between a controller and a storage unit of a base station according to various embodiments of the disclosure.

FIG. 3 illustrates a link between a controller and a storage unit of a base station according to various embodiments of the disclosure. FIG. 3 is construed as a detailed configuration of the storage unit 230 and the controller 240.

Referring to FIG. 3, the storage unit 230 may store a DL/UL buffer state 310 and a TDD configuration list 320. The controller 240 may include a selection module 330 and a scheduling module 340.

The DL/UL buffer state 310 may include a DL buffer state and a UL buffer state. The DL buffer state may refer to information indicating the total amount of data for a base station 110 to transmit in a cell, and the UL buffer state may refer to information indicating the amount of data for at least one terminal to transmit to the base station 110 in the cell. Here, since the at least one terminal may periodically or aperiodically report information (e.g., buffer state information) about the amount of data for the terminal to transmit to the base station 110, the base station 110 may identify the amount of data to be transmitted by the at least one terminal.

The TDD configuration list 320 may refer to a list of a plurality of TDD configurations. Here, a TDD configuration refers to a pattern that specifies whether each of a plurality of subframes included in a frame (e.g., a radio frame) is for UL transmission or for DL transmission. That is, the TDD configuration refers to the result of allocating the plurality of subframes for DL transmission and UL transmission. That is, the TDD configuration list 320 may include a plurality of TDD configurations having different ratios of DL transmission and UL transmission. The TDD configuration list 320 may include N TDD configurations in which DL transmission or UL transmission is assigned to each subframe in units of K subframes.

For example, referring to FIG. 4, the TDD configuration list 320 may include five TDD configurations 401 to 405 in which UL transmission or DL transmission is assigned for 8 subframes. However, in embodiments of the disclosure, the number of TDD configurations included in the TDD configuration list 320 and the number of subframes included in one TDD configuration are not limited. A particular TDD configuration among the plurality of TDD configurations included in the TDD configuration list 320 may be defined as a basic TDD configuration. Here, the basic TDD configuration may be a TDD configuration that is shared by a plurality of base stations in common. That is, the basic TDD configuration may be a TDD configuration used in a non-dynamic TDD mode. In addition, the basic TDD configuration may refer to a TDD configuration that is a criterion for comparing the link direction of each subframe (i.e., whether each subframe is for DL transmission or UL transmission) of a particular TDD configuration selected by the base station 110. The basic TDD configuration may be referred to as a 'default TDD configuration', a 'reference TDD configuration', a 'predetermined TDD configuration', or other technical terms equivalent thereto. The base station 110 may share the basic TDD configuration with at least one adjacent base station.

The selection module 330 may determine a particular TDD configuration from the TDD configuration list 320 based on the DL/UL buffer state 310. In some embodiments, the selection module 330 may determine a particular TDD configuration from the TDD configuration list 320 based on the ratio of DL buffering data and UL buffering data. In other embodiments, the selection module 330 may determine a particular TDD configuration from the TDD configuration list 320 using information about resources allocated by the scheduling module 340 for DL transmission or UL transmission. Here, the information about the resources allocated by the scheduling module 340 for DL transmission or UL transmission may be determined based on statistical information about data previously transmitted and received.

The scheduling module 340 may allocate a resource based on the TDD configuration determined by the selection module 330. Specifically, the scheduling module 340 may allocate a resource for a subframe in the determined TDD configuration, which is assigned DL transmission or UL transmission differently from in the basic TDD configuration, in consideration of inter-cell interference. In some embodiments, the scheduling module 340 may restrictively allocate a resource to a terminal that is likely to have interference. Here, the possibility of occurrence of interference may be determined based on at least one of the signal-to-noise ratio (SNR), the channel quality indicator (CQI), and the path loss of a channel with each terminal.

Figure 5:
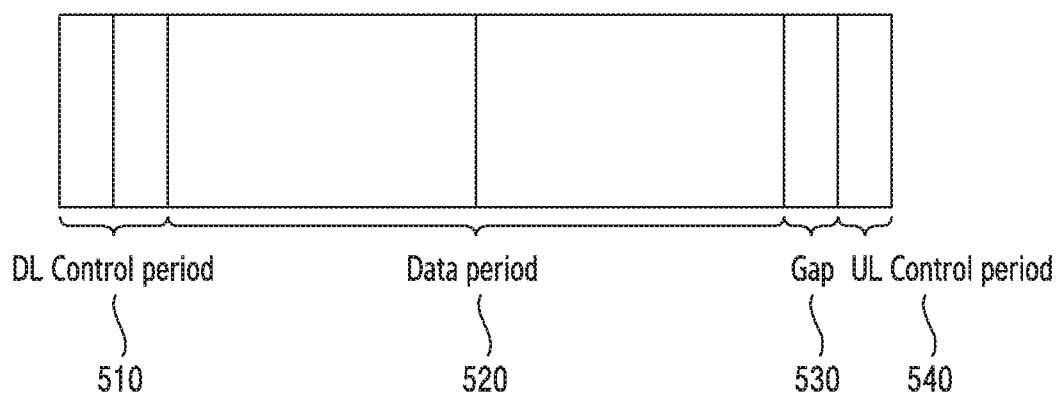
FIG. 5 illustrates the structure of a subframe according to various embodiments of the disclosure.

FIG. 5 illustrates a structure of a subframe according to various embodiments of the disclosure.

Referring to FIG. 5, a subframe may include a DL control period 510, a data period 520, a gap 530, and a UL control period 540. The subframe may be associated with both DL transmission and UL transmission. However, the order of the control period 510, the data period 520, the gap 530, and the UL control period 540 is not limited.

The DL control period 510 may include a reference signal and a DL control channel, which may be for fast demodulation of a DL data channel. The reference signal may be used to estimate a channel. The DL control channel may be used to schedule the data period 520. When the data period 520 includes data for UL transmission, the DL control channel may be used to schedule a data period included in a subframe after the subframe including the DL control channel. According to various embodiments, the DL control period 510 may be used to transmit information indicating whether the frame is allocated for UL transmission or for DL transmission. For example, information indicating UL transmission or DL transmission may indicate that the frame or a frame after a plurality of frames is allocated for UL transmission or DL transmission.

The data period 520 may include data for DL transmission and/or data for UL transmission. That is, through the data period 520, the base station 110 may transmit data to the terminal 120 and may receive data from the terminal 120 in one subframe.

The gap 530 may be positioned between data 520 and UL control information 540. The gap 530 may exist only when the data period 520 includes data for DL transmission, and may be omitted when the data period 520 includes data for UL transmission. The gap 530 may refer to a time period during which the terminal 120 performs neither DL reception nor UL transmission. Here, DL reception may mean that the terminal 120 receives a signal, data, and information from the base station. UL transmission may mean that the base station transmits a signal, data, and information to the terminal 120. The gap 530 may refer to a period allocated for demodulating data for DL transmission and switching from DL transmission to UL transmission.

The UL control period 540 is used to transmit uplink control information transmitted by the terminal. For example, the UL control period 540 may be used to transmit an acknowledgment (ACK) or a negative acknowledgment (NACK) of reception of data from the base station 110 through the data period 520. In another example, the UL control period 540 may be used to feed back uplink buffer state information of the terminal.

At least one of the DL control period 510 and the UL control period 540 may be omitted from the subframe illustrated in FIG. 5. That is, at least one of the DL control period 510 and the UL control period 540 may be excluded according to the purpose and configuration of the subframe.

Figure 6:
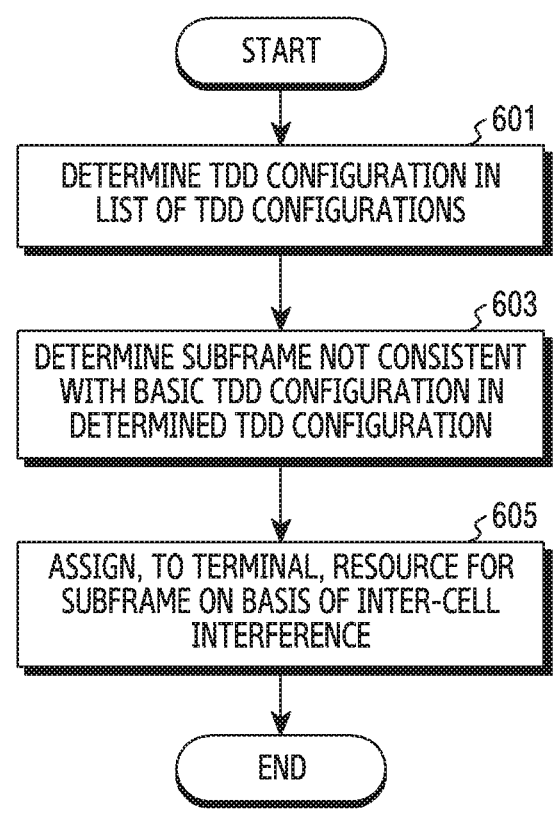
FIG. 6 illustrates an operating method of a base station according to various embodiments of the disclosure.

FIG. 6 illustrates an operating method of a base station according to various embodiments of the disclosure. FIG. 6 illustrates an operating method of the base station 110.

Referring to FIG. 6, in operation 601, the base station 110 determines a TDD configuration. In some embodiments, the base station 110 may determine a particular TDD configuration from a TDD configuration list based on a DL/UL buffer state. In other embodiments, the base station 110 may determine a particular TDD configuration from the TDD configuration list based on the amount of resources allocated for DL transmissions and the amount of resources allocated for UL transmissions. Specifically, the base station 110 may compare the quantity of resources allocated for DL transmission with P thresholds, may compare the amount $B_{UL}$ of resources allocated for UL transmission with Q thresholds, and may then determine a particular TDD configuration based on the comparison result. In some embodiments, the base station 110 may store information about a TDD configuration corresponding to the amount of resources allocated for DL transmissions and the amount of resources allocated for UL transmissions as in Table 1 below.

TABLE 1

|  | $B_{DL} \leq Th_{DL(1)}$ | ... | $Th_{DL(P-1)} < B_{DL} \leq Th_{DL(P)}$ | $Th_{DL(P)} < B_{DL}$ |
|---|---|---|---|---|
| $B_{UL} \leq Th_{UL(1)}$ | TDD_CONFIG_f(1, 1) | ... | TDD_CONFIG_f(1, P) | TDD_CONFIG_f(1, P + 1) |
| ... | ... | ...... | ... | ... |
| $Th_{UL(U-1)} < B_{UL} \leq Th_{UL(Q)}$ | TDD_CONFIG_f(Q, 1) | ... | TDD_CONFIG_f(Q, P) | TDD_CONFIG_f(Q, P + 1) |
| $Th_{UL(Q)} < B_{UL}$ | TDD_CONFIG_f(Q + 1, 1) | ... | TDD_CONFIG_f(Q + 1, P) | TDD_CONFIG_f(Q + 1, P + 1) |

For example, referring to Table 1, when the TDD configuration list includes (P+1)(Q+1) TDD configurations, the amount $B_{DL}$ of resources allocated for DL transmissions is greater than $Th_{DL(P-1)}$ and is equal to or less than $Th_{DL(P)}$, and the amount $B_{UL}$ of resources allocated for UL transmissions is greater than $Th_{UL(U-1)}$ and is equal to or less than $Th_{UL(Q)}$, the base station 110 may determine a particular TDD configuration, which is TDD_CONFIG_f(Q,P), from the TDD configuration list. In some embodiments, there may be one threshold value for UL transmission and one threshold value for DL transmission, which is described in detail below in FIG. 8.

Figure 7:
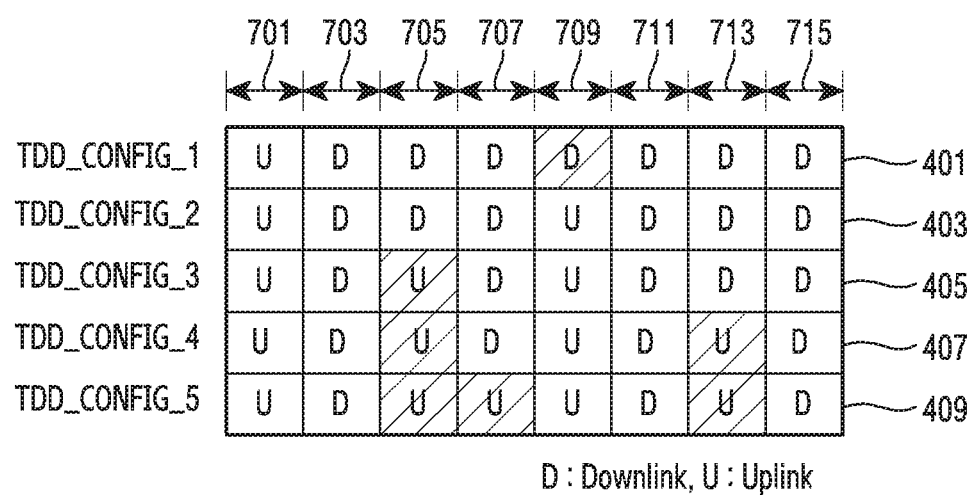
FIG. 7 illustrates a subframe, which is not consistent with a basic TDD configuration, in a TDD configuration according to various embodiments of the disclosure.

In operation 603, the base station 110 determines a subframe, which is not consistent with a basic TDD configuration, in the determined TDD configuration. Specifically, the base station 110 may compare a plurality of subframes of the determined TDD configuration with a corresponding plurality of subframes of the basic TDD configuration and may determine a subframe of the determined TDD configuration, which is not consistent with the link direction of each subframe (i.e., whether each subframe is for DL transmission or UL transmission) of the basic TDD configuration. For example, referring to FIG. 7, when the basic TDD configuration is defined as TDD_CONFIG. 2, first subframes 701, second subframes 703, and eighth subframes 715 in TDD_CONFIG_1, TDD_CONFIG_3, TDD_CONFIG_4, and TDD_CONFIG_5 have the same data characteristics as in the basic TDD configuration. However, a fifth subframe 709 in TDD_CONFIG_1, a third subframe 705 in TDD_CONFIG_3, a third subframe 705 and a seventh subframe 713 in TDD_CONFIG_4, and a third subframe 705, a fourth subframe 707, and a seventh subframe 713 in the TDD_CONFIG_5 have different data characteristics from those in the basic TDD configuration. Thus, when the base station 110 determines TDD_CONFIG_3, the base station 110 may determine the third subframe 705 to be a different subframe from that in the basic TDD configuration. In some embodiments, the basic TDD configuration may refer to a predetermined TDD configuration. In this case, the predetermined TDD configuration may be set equally for the base station 110 and a base station 115 causing interference in the base station 110.

In operation 605, the base station 110 allocates a resource for a subframe based on inter-cell interference. Specifically, the base station 110 may allocate resources for a subframe consistent with the basic TDD configuration and a subframe not consistent with the basic TDD configuration in the determined TDD configuration based on inter-cell interference. In some embodiments, when allocating a resource for the subframe which not consistent with the basic TDD configuration, the base station 110 may identify a terminal which is likely to cause interference in an adjacent cell and may restrictively allocate a resource to the identified terminal.

Figure 8:
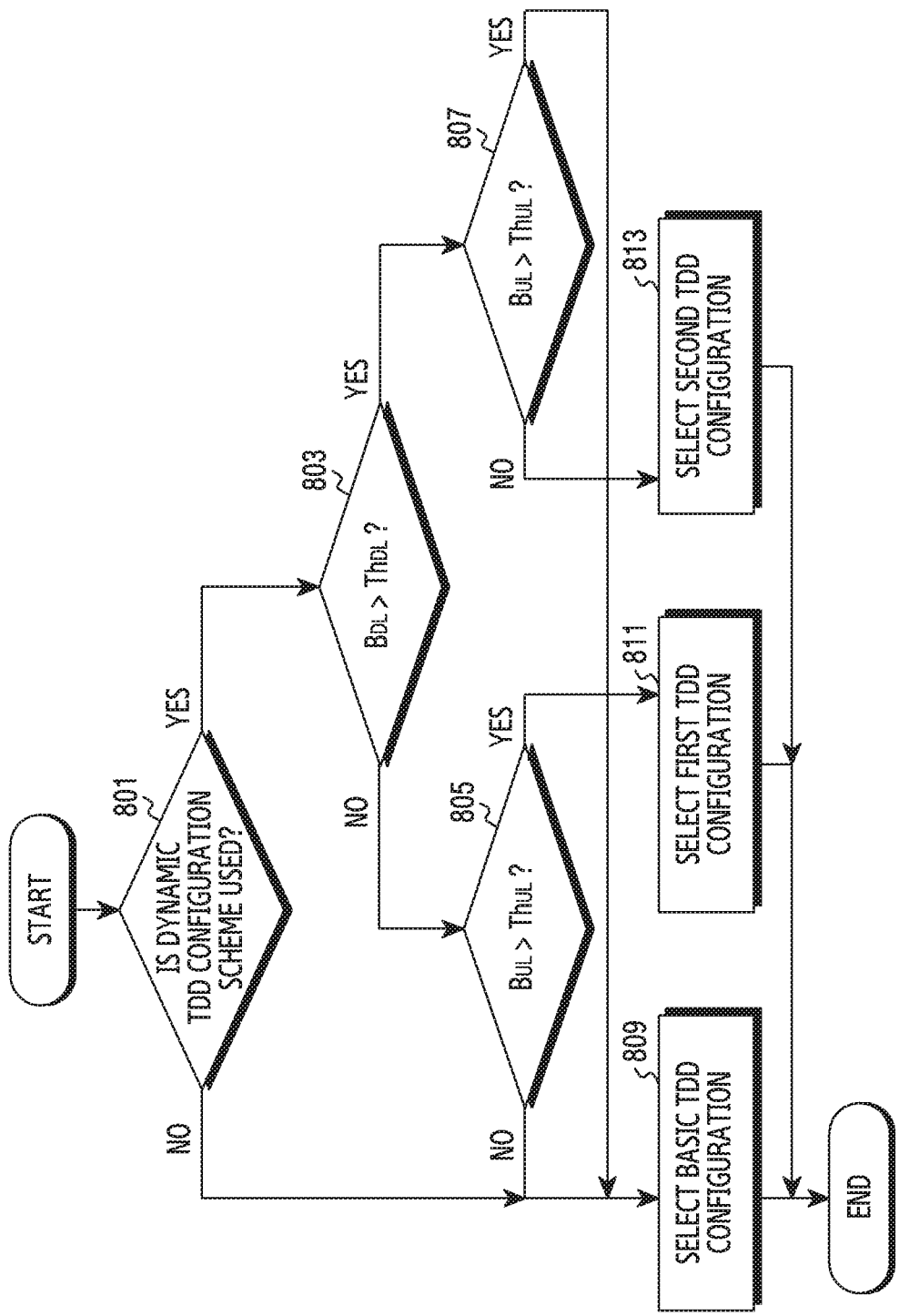
FIG. 8 illustrates an operating method of a base station for determining a TDD configuration according to various embodiments of the disclosure.

FIG. 8 illustrates an operating method of a base station for determining a TDD configuration according to various embodiments of the disclosure. FIG. 8 illustrates an operating method of the base station 110.

Referring to FIG. 8, in operation 801, the base station 110 identifies whether the base station 110 uses a dynamic TDD configuration. When the base station 110 does not use a dynamic TDD configuration scheme, the base station 110 performs operation 809. That is, when the base station 110 does not use the dynamic TDD configuration, the base station 110 may select a basic TDD configuration. Here, the dynamic TDD configuration scheme may refer to a method of determining a particular TDD configuration from a TDD configuration list based on the amount $B_{DL}$ of resources allocated for DL transmission and the amount $B_{UL}$ of resources allocated for UL transmission.

When the base station 110 uses the dynamic TDD configuration scheme, the base station 110 may determine whether the amount $B_{DL}$ of resources allocated for DL transmission is greater than a threshold value $Th_{DL}$ in operation 803. Here, the threshold value $Th_{DL}$ may be a value preset by the base station 110 or a system designer.

When the amount $B_{DL}$ of resources allocated for DL transmission is not greater than the threshold value $Th_{DL}$, the base station 110 may determine whether the amount $B_{UL}$ of resources allocated for UL transmission is greater than a threshold value $Th_{UL}$ in operation 805. Here, the threshold value $Th_{UL}$ may be a value preset by the base station 110 or the system designer. When the amount $B_{UL}$ of resources allocated for UL transmission is not greater than the threshold value $Th_{UL}$, the base station 110 performs operation 809.

When the amount $B_{DL}$ of resources allocated for DL transmission is greater than the threshold value $Th_{DL}$, the base station 110 may determine whether the amount $B_{UL}$ of resources allocated for UL transmission is greater than the threshold value $Th_{UL}$ in operation 807. When the amount $B_{UL}$ of resources allocated for UL transmission is greater than the threshold value $Th_{UL}$, the base station 110 may perform operation 809.

In operation 809, the base station 110 may select the basic TDD configuration. That is, when the dynamic configuration scheme is not used, the base station 110 may select the basic TDD configuration. Also, when the base station 110 cannot determine that it is necessary to increase the ratio of resources for DL transmission or resources for UL transmission, the base station 110 may select the basic TDD configuration.

When the amount $B_{UL}$ of resources allocated for UL transmission is greater than the threshold value $Th_{UL}$, the base station 110 may select a first TDD configuration in operation 811. Here, the first TDD configuration may refer to a TDD configuration in which the largest number of subframes is assigned for UL transmission in the TDD configuration list. For example, referring to FIG. 4, the first TDD configuration may be TDD_CONFIG_5.

When the amount $B_{UL}$ of resources allocated for UL transmission is not greater than the threshold $Th_{UL}$, the base station 110 may select a second TDD configuration in operation 813. Here, the second TDD configuration may refer to a TDD configuration in which the largest number of subframes is assigned for DL transmission in the TDD configuration list. For example, referring to FIG. 4, the second TDD configuration may be TDD_CONFIG_1.

Figure 9:
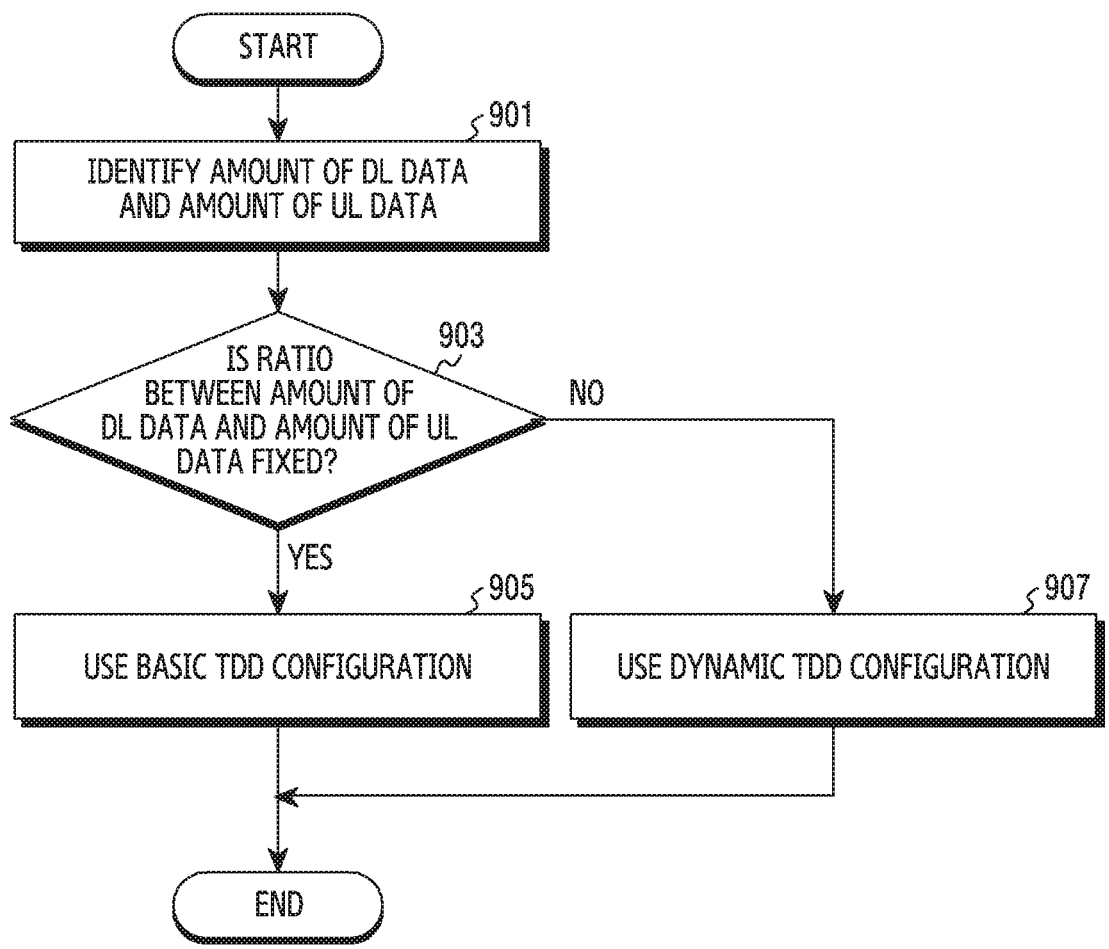
FIG. 9 illustrates an operating method of a base station for determining whether to use a dynamic TDD configuration according to various embodiments of the disclosure.

FIG. 9 illustrates an operating method of a base station for determining whether to use a dynamic TDD configuration according to various embodiments of the disclosure. FIG. 9 illustrates an operating method of the base station 110.

Referring to FIG. 9, in operation 901, the base station 110 may identify the amount $B_{DL}$ of DL data and the amount $B_{UL}$ of UL data. Here, the amount of DL data, $B_{DL}$, may mean the total amount of data to be transmitted by the base station 110 to at least one terminal located in a cell. In addition, the amount of UL data, $B_{UL}$, may mean the total amount of data to be transmitted by at least one terminal located in the cell to the base station. The base station 110 autonomously determines data to transmit to the at least one terminal located in the cell and can thus identify the amount $B_{DL}$ of DL data. Also, since the base station 110 receives information about data to be transmitted by the at least one terminal located in the cell from the at least one terminal and can thus identify the amount $B_{UL}$ of UL data.

In operation 903, the base station 110 may determine whether the ratio between the amount $B_{DL}$ of DL data and the amount $B_{UL}$ of UL data is fixed. In some embodiments, the base station 110 may determine whether the ratio between the amount $B_{DL}$ of DL data and the amount $B_{UL}$ of UL data is fixed and whether it is appropriate to use a basic TDD configuration. When the ratio between the amount $B_{DL}$ of DL data and the amount $B_{UL}$ of UL data is fixed, the base station 110 performs operation 905. When the ratio between the amount $B_{DL}$ of DL data and the amount $B_{UL}$ of UL data is not fixed, the base station 110 performs operation 907.

In operation 905, the base station 110 may use the basic TDD configuration. That is, when the ratio between the amount $B_{DL}$ of DL data and the amount $B_{UL}$ of UL data is fixed, it is not necessary to dynamically change the ratio between resources for DL transmission and resources for UL transmission, and thus the base station 110 may use the basic TDD configuration.

In operation 907, the base station 110 may use a dynamic TDD configuration. That is, when the ratio between the amount $B_{DL}$ of DL data and the amount $B_{UL}$ of UL data is not fixed, the base station 110 may use a dynamic TDD configuration to dynamically change the ratio between resources for DL transmission and resources for UL transmission according to the characteristics of data, thus efficiently using resources.

In some embodiments, each of operations 901 to 907 of FIG. 9 described above may be repeatedly performed according to a predetermined period.

Figure 10A:
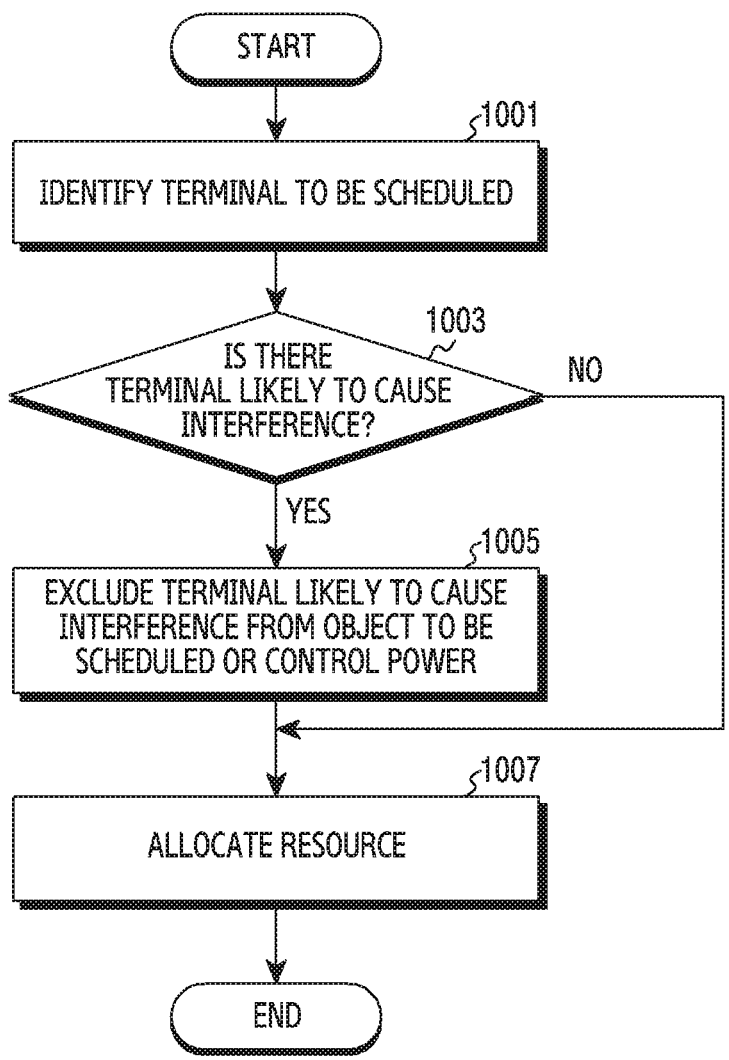
FIG. 10A illustrates an operating method of a base station for allocating resources for uplink transmission according to various embodiments of the disclosure.

FIG. 10A illustrates an operating method of a base station for allocating resources for UL transmission according to various embodiments of the disclosure. FIG. 10A illustrates an operation method of the base station 110, which is a resource allocation method for a subframe allocated for UL transmission as a subframe which is not consistent with a basic TDD configuration.

Referring to FIG. 10A, in operation 1001, the base station 110 identifies at least one terminal to be scheduled. The base station 110 may identify an object to be scheduled based on information including at least one of a resource request (e.g., a scheduling request (SR)) and buffer state information received from the at least one terminal. Here, the information may indicate the amount and type of data to be transmitted by the at least one terminal. Thus, the base station 110 may identify the at least one terminal to be scheduled through the information.

In operation 1003, the base station 110 may identify whether there is a terminal which is likely to cause interference. When there is no terminal which is likely to cause interference, the base station 110 performs operation 1007. In some embodiments, a terminal being likely to cause interference may mean that the terminal is located in an outskirt area of a cell. For example, when a terminal has an SNR or CQI less than or equal to a threshold value or has a path loss equal to or greater than a threshold value, the terminal may be determined to be located in the outskirt area of the cell.

When there is a terminal which is likely to cause interference, the base station 110 may exclude the terminal which is likely to cause interference from the object to be scheduled or may control power for the terminal in operation 1005. That is, in some embodiments, the base station 110 may control the terminal which is likely to cause interference to be scheduled in a different subframe (e.g., a subframe consistent with the basic TDD configuration). In other embodiments, the base station 110 may determine to reduce the transmission power of the terminal 120 having a path loss equal to or greater than the threshold value. Accordingly, although not shown in FIG. 10A, the base station 110 may transmit a message for instructing power control.

In operation 1007, the base station 110 allocates a resource. Specifically, the base station 110 may allocate a resource for the subframe, which is not consistent with the basic TDD configuration, in a determined TDD configuration of a TDD configuration list. In some embodiments, the base station 110 may allocate the resource to a terminal having an SNR or CQI equal to or greater than the threshold value. In other embodiments, the base station 110 may allocate the resource for a terminal having a higher SNR or CQI with a higher probability. Thereafter, although not shown in FIG. 10A, the base station 110 may transmit control information indicating a resource allocation result and may receive an uplink signal.

Figure 10B:
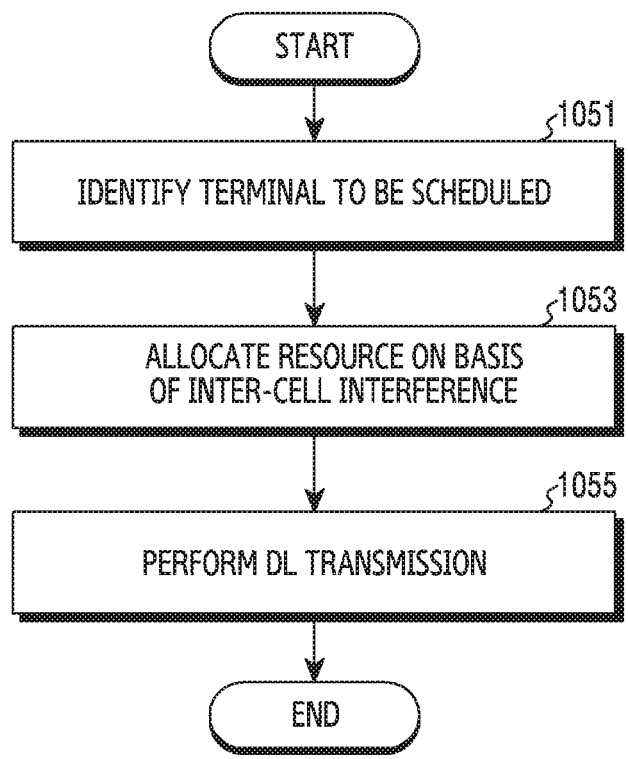
FIG. 10B illustrates an operating method of a base station for allocating resources for downlink transmission according to various embodiments of the disclosure.

FIG. 10B illustrates an operating method of a base station for allocating resources for DL transmission according to various embodiments of the disclosure. FIG. 10B illustrates an operation method of the base station 110, which is a resource allocation method for a subframe allocated for DL transmission as a subframe which is not consistent with a basic TDD configuration.

Referring to FIG. 10B, in operation 1051, the base station 110 identifies at least one terminal to be scheduled. The base station 110 may identify an object to be scheduled based on information including at least one of a resource request and buffer state information received from the at least one terminal. Here, the information may indicate the amount and type of data to be transmitted by the at least one terminal. Thus, the base station 110 may identify the at least one terminal to be scheduled through the information.

In operation 1053, the base station 110 allocates a resource based on inter-cell interference. Specifically, the base station 110 may determine a subframe, which is not consistent with the basic TDD configuration, in a determined TDD configuration, may determine a terminal having an SNR or CQI equal to or higher than a threshold value among the at least one terminal to be scheduled, and may allocate a resource to the determined terminal. In some embodiments, the base station 110 may increase a resource allocation probability for a terminal having a higher SNR for a channel.

In operation 1055, the base station 110 performs DL transmission. Specifically, the base station 110 may perform DL transmission with transmission power reduced by a threshold value from the transmission power of the base station 110 for using the basic TDD configuration. Here, the transmission power of the base station 110 may mean the power required for the base station 110 to transmit data to the terminal. As described above, the base station 110 may perform DL transmission with reduced transmission power of the base station 110, thereby reducing the impact of interference on UL transmission of an adjacent cell.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclo-

The invention claimed is:

1. A method for operating a base station in a wireless communication system, the method comprising:
   determining whether to use a dynamic time division duplex (TDD) mode based on whether a ratio between data for an uplink transmission and data for a downlink transmission is constant;
   determining a TDD configuration including a plurality of subframes when the base station uses the dynamic TDD mode;
   allocating a resource within a subframe, which is not consistent with a link direction of a corresponding subframe in a predetermined TDD configuration, from among the plurality of subframes based on inter-cell interference, wherein the predetermined TDD configuration is used in a non-dynamic TDD mode and is shared by a plurality of base stations including the base station; and
   performing communication with at least one terminal using the resource within the subframe.

2. The method of claim 1, further comprising determining the TDD configuration based on an uplink buffer state and a downlink buffer state.

3. The method of claim 1, further comprising determining the TDD configuration based on an amount of resources allocated for an uplink transmission and an amount of resources allocated for a downlink transmission.

4. The method of claim 3, wherein the determining of the TDD configuration comprises:
   comparing the amount of resources allocated for the uplink transmission and the amount of resources allocated for the downlink transmission with at least one first threshold value and at least one second threshold value, respectively; and
   determining the TDD configuration according to a result of comparison with the at least one first threshold value and the at least one second threshold value.

5. The method of claim 1, further comprising:
   comparing a plurality of first subframes comprised in the TDD configuration with a plurality of second subframes comprised in the predetermined TDD configuration, wherein the plurality of second subframes correspond to the plurality of first subframes; and
   determining the subframe, which is not consistent with the predetermined TDD configuration, according to a result of comparing the plurality of first subframes with the plurality of second subframes.

6. The method of claim 1, wherein the allocating of the resource comprises excluding a terminal from at least one terminal to be scheduled in case that at least one of a signal-to-noise ratio (SNR) and a channel quality indicator (CQI) for the terminal is less than or equal to a threshold value.

7. The method of claim 1, wherein the allocating of the resource comprises reducing a transmission power of the at least one terminal having a path loss which is equal to or greater than a threshold value.

8. The method of claim 7, further comprising:
   transmitting, to the at least one terminal, a power control command indicating a decrease of the transmission power.

9. The method of claim 1, wherein the performing of the communication with at least one terminal in the subframe comprises transmitting, to the at least one terminal, data in the subframe by reducing a transmission power of the base station.

10. An apparatus for a base station in a wireless communication system, the apparatus comprising:
    a transceiver; and
    at least one processor operably coupled to the transceiver, wherein the at least one processor is configured to:
       determine whether to use a dynamic time division duplex (TDD) mode based on whether a ratio between data for an uplink transmission and data for a downlink transmission is constant,
       determine a TDD configuration including a plurality of subframes when the base station uses the dynamic TDD mode,
       allocate a resource within a subframe, which is not consistent with a link direction of a corresponding subframe in a predetermined TDD configuration, from among the plurality of subframes based on inter-cell interference, wherein the predetermined TDD configuration is used in a non-dynamic TDD mode and is shared by a plurality of base stations including the base station, and
       perform communication with at least one terminal in-using the resource within the subframe.

11. The apparatus of claim 10, wherein the at least one processor is further configured to determine the TDD configuration based on an uplink buffer state and a downlink buffer state.

12. The apparatus of claim 10, wherein the at least one processor is further configured to determine the TDD configuration based on an amount of resources allocated for an uplink transmission and an amount of resources allocated for a downlink transmission.

13. The apparatus of claim 12, wherein, in order to determine the TDD configuration, the at least one processor is further configured to:
    compare the amount of resources allocated for the uplink transmission and the amount of resources allocated for the downlink transmission with at least one first threshold value and at least one second threshold value, respectively, and
    determine the TDD configuration according to a result of comparison with the at least one first threshold value and the at least one second threshold value.

14. The apparatus of claim 10, wherein the at least one processor is further configured to:
    compare a plurality of first subframes comprised in the TDD configuration with a plurality of second subframes comprised in the predetermined TDD configuration, wherein the plurality of second subframes correspond to the plurality of first subframes, and
    determine the subframe, which is not consistent with the predetermined TDD configuration, according to a result of comparing the plurality of first subframes with the plurality of second subframes.

15. The apparatus of claim 10, wherein, in order to allocate the resource, the at least one processor is further configured to exclude a terminal from at least one terminal to be scheduled in case that at least one of a signal-to-noise ratio (SNR) and a channel quality indicator (CQI) for the terminal is less than or equal to a threshold value.

16. The apparatus of claim 10, wherein, in order to allocate the resource, the at least one processor is further configured to reduce a transmission power of the at least one terminal having a path loss which is equal to or greater than a threshold value.

17. The apparatus of claim 16, wherein the at least one processor is further configured to transmit, to the at least one terminal, a power control command indicating a decrease of the transmission power.

18. The apparatus of claim 10, wherein, in order to perform the communication with at least one terminal in the subframe, the at least one processor is further configured to transmit, to the at least one terminal, data in the subframe by reducing a transmission power of the base station.

* * * * *